United States Patent [19]

Martin et al.

[11] Patent Number: 4,778,483
[45] Date of Patent: Oct. 18, 1988

[54] GASIFICATION REACTOR WITH INTERNAL GAS BAFFLING AND LIQUID COLLECTOR

[75] Inventors: Michael C. Martin; George M. Gulko, both of Houston, Tex.

[73] Assignee: Texaco Inc., White Plains, N.Y.

[21] Appl. No.: 55,974

[22] Filed: Jun. 1, 1987

[51] Int. Cl.$^4$ .............................. C10J 3/48; C10J 3/89
[52] U.S. Cl. .................... 48/69; 48/DIG. 2; 55/256; 55/257.5
[58] Field of Search .............. 48/69, 77, DIG. 2, 128, 48/63, 64, 76, 62 R; 55/244, 256, 257 NP; 110/171; 422/207

[56] References Cited

U.S. PATENT DOCUMENTS 3,546,851 12/1970 Hardison et al. .............. 55/257 MP
4,494,963 1/1985 Reich ........................................ 48/69
4,605,423 8/1986 Koog ........................................ 48/69

Primary Examiner—Peter Kratz
Attorney, Agent, or Firm—Robert A. Kulason; James J. O'Loughlin; Robert B. Burns

[57] ABSTRACT

A gasifier having a combustion chamber in which a hydrocarbonaceous fuel is burned to produce a usable gas. A quench chamber is positioned to receive said gas and other byproducts as an effluent stream, in a coolant liquid quench bath. A dip tube and draft tube define a tortuous passage within a quench chamber for directing the gaseous segment to a discharge port by way of said quench bath. A baffle positioned in the path of the gas includes a manifold at the baffle lower end to receive condensate which flows from said baffle face and returns water to the quench bath.

6 Claims, 2 Drawing Sheets

GASIFICATION REACTOR WITH INTERNAL GAS BAFFLING AND LIQUID COLLECTOR

BACKGROUND OF THE INVENTION

In a normal coal gasification process wherein a particulated carbonaceous fuel such as coal or coke or a carbonaceous gas is burned, the process is carried out at relatively hot temperatures and high pressures. A facility for achieving such a process is generally embodied in a gasifier comprised basically of a steel shell having internally insulated walls. The latter are formed preferably of a refractory which defines the unit combustion chamber.

As injected fuel is burned or partially burned in the combustion chamber, the effluent will be discharged from a port at the lower end of said chamber. It will then enter an adjacently positioned quench chamber to be cooled.

The quench chamber is comprised primarily of a pool formed of a liquid such as water. As the higher temperature effluent contacts and passes through the cooling pool, it will be reduced in temperature as well as pressure. The gas, preferably in saturated condition at about 425° to 450° F., will be conducted from the quench chamber for further processing.

When the fuel is a solid such as coal or coke, this arrangement permits the solid portion of the effluent, in the form of ash, to be retained in the liquid pool, and subsequently to be discharged as a slag slurry. The gaseous component, however, in passing through quench chamber, will carry with it a substantial amount of the liquid coolant.

A minimal amount of liquid entrained in the exiting gas is not considered objectionable to the overall process. However, excessive liquid carried from the quench chamber and into downstream equipment, is found to pose operational problems.

The path of the exiting saturated gas, is defined by baffling placed in the quench chamber. Consequently, as liquid-carrying gas contacts baffle surfaces, a certain amount of the liquid will coalesce on the baffle surfaces. However, the rapidly flowing gas will re-entrain liquid droplets by sweeping them from the baffle's lower edge.

Toward overcoming this undesirable characteristic in a water quenched gasifier unit, there is presently provided means for accumulating and retaining coolant water which has been separated from a produced gaseous stream. The water, after impinging against one of the baffle plates which defines the path of the gaseous stream, is caused to gravitate and accumulate in a manifold, or similar means for retaining the liquid. As the substantially liquid-free gas continues on its path toward the gasifier discharge exit, retained liquid will drain back into the coolant pool.

It is therefore an object of the invention to provide a gasifier of the type contemplated in which the quench chamber is provided with means for retaining cooling liquid which would otherwise be carried from the chamber.

A further object is to provide a gasifier of the type in which the hot produced gas is water cooled, wherein gas directing baffles are provided with a water accumulating facility to redirect water back into the quenching pool.

Figure 1:
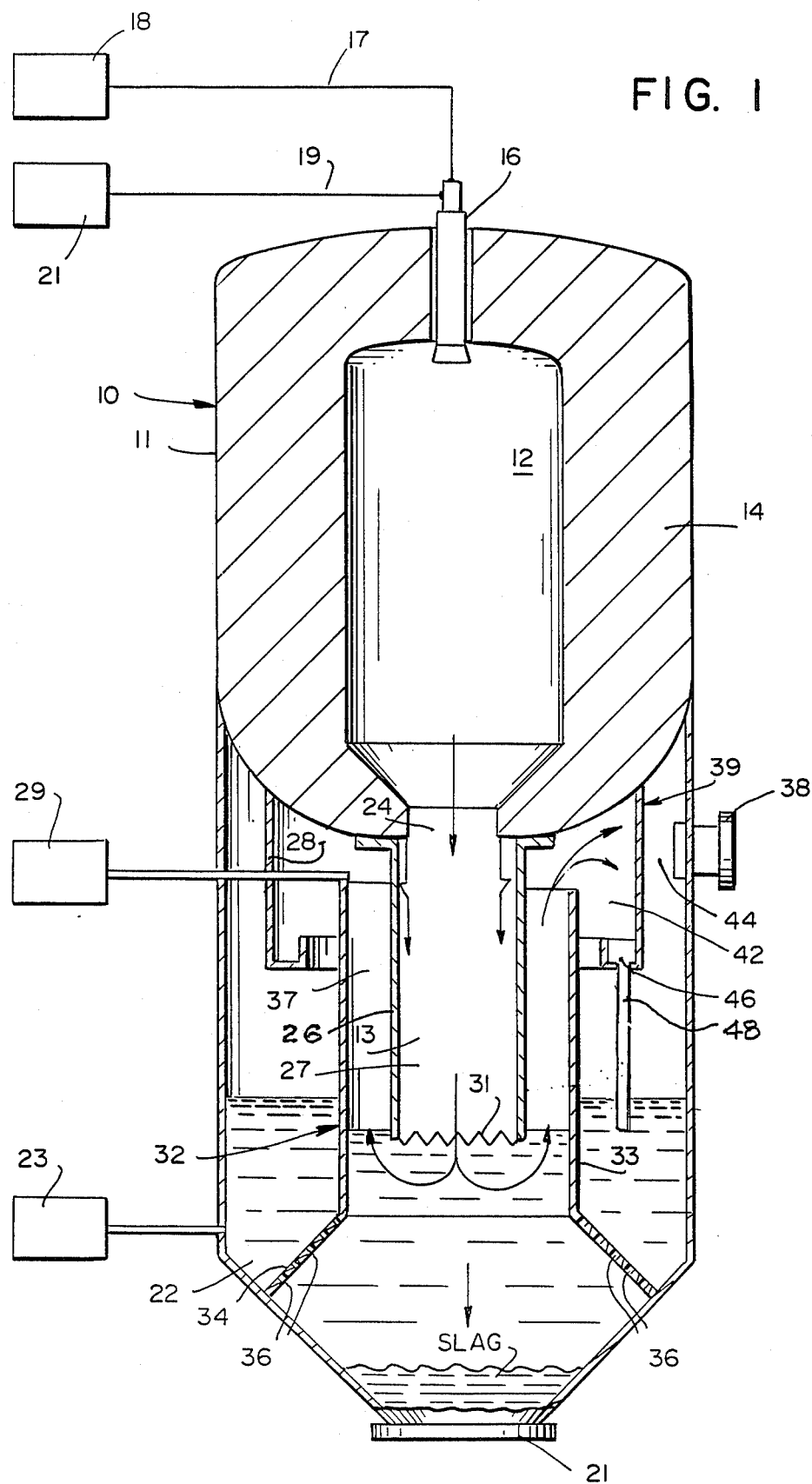
FIG. 1 is an elevation view in cross-section of a gasifier of the type herein disclosed.

Referring to the drawings, a gasifier 10 of the type generally contemplated is comprised primarily of an outer steel shell 11 which houses a combustion chamber 12 at the upper end and a quench chamber 13 at the lower end.

Combustion chamber 12 is furnished with a refractory wall 14 capable of withstanding the normal operating temperatures which read 2300° F. and above. A fuel stream comprised of pulverized carbonaceous fuel such as coal, coke or the like, is fed into combustion chamber 12 by way of a burner 16 removably positioned in the upper walls of said chamber. Burner 16 in the normal manner, is communicated by line 17 with a source 18 of the fuel to be burned, preferably with a pressurized source of an aqueous slurry formed of the particulated carbonaceous material. The burner is further communicated by line 19 with a source of combustion supporting gas 21 such as oxygen or air.

The lower end of gasifier shell 11 houses quench chamber 13 into which hot effluent from combustion chamber 12 is passed. Said quench chamber 13 includes primarily a pool of liquid coolant 22, preferably water, which is furnished to the quench chamber through a pressurized source 29. The level of the water in the quench chamber pool 22 is maintained at a desired height to assure an efficient operation depending on the conditions of the effluent gas passed into said chamber 13 from combustion chamber 12.

The lower end of gasifier shell 11 is provided with a discharge port 23 through which water and fine particulates are removed from quench chamber 13 in the form of a slurry.

Combustion chamber 12 is communicated with the lower quench chamber 13 through a constricted through 24 from which a dip tube 26 extends. The latter forms a passageway 27 whereby the hot effluent is led downwardly toward the coolant pool 22.

A quench ring 28 is positioned adjacent to dip tube 26 and communicated with a pressurized source 29 of water whereby to sustain the dip tube 26 inner wall in a wetted condition to best accommodate the downward effluent flow.

To most efficiently achieve cooling of the effluent, the lower end of the dip tube 26 is serrated at 31, and positioned to be below the normal water level of the coolant. Operationally, the hot, pressurized effluent, in contacting water pool 22, will tend to create a disturbed condition. The surface of the water will thus not be clearly defined in the vicinity of the dip tube.

A draft tube 32 is positioned in quench chamber 13 and comprises an elongated cylindrical body 33, fixedly supported in the gasifier shell 11. The lower part of draft tube 32 is submerged in the coolant pool 22.

Draft tube 32 as noted includes a cylindrical body segment 33 which terminates adjacent to, but spaced at its upper end, from quench ring 28. The draft tube body is also spaced from the water of dip tube 26 to define a contact annulus 37. Cooled, produced gas passes through said contact section and toward the gas discharge outlet 38 formed in the shell 11 wall of quench chamber 13.

Thus, as the cooled gas leaves contact annulus 37, it will engage the inner wall of a baffle member 39 which extends downwardly from the underside of combustion chamber 12. Said baffle 39 extends a distance below the upper edge of the draft tube, but above the surface of liquid pool 22, thereby defining a second annular gas passage 42.

In the normal course of quench cooling the upwardly flowing produced gas stream, the latter will convey with it a certain amount of water from the coolant pool 22. However, as the gaseous, water carrying stream impinges against the inner surface 43 of baffle 39, the water will tend to coalesce and flow downwardly along said inner surface.

In the usual prior art construction, this coalesced water, upon reaching the lower end of the baffle, will accumulate into varying sized water droplets. Thereafter, as the downwardly flowing produced gas stream is reversed in direction through the second annular gas passage 42 and into annular 44, it will sweep the baffle lower edge, re-entraining the liquid droplets which have gravitated to and are suspended from said edge.

In the presently shown improved embodiment of the invention, there is provided a manifold 46 or similar water collecting means at the lower edge of baffle 39. Thus, downwardly flowing water droplets will be retained in the manifold rather than being re-entrained in the passing gaseous stream.

Figure 2:
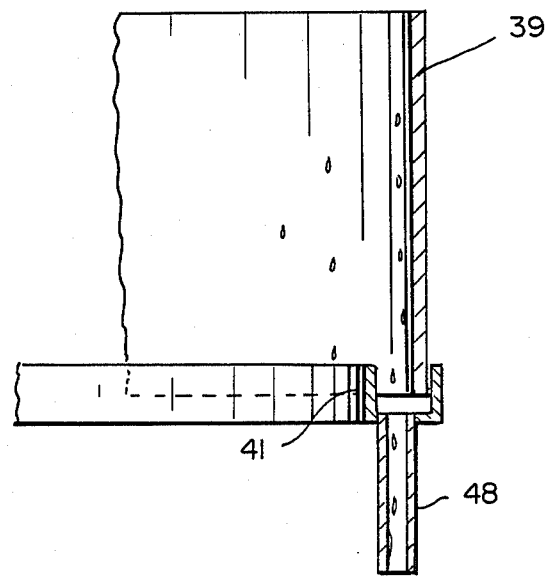
FIG. 2 is a segmentary view on an enlarged scale of a section of the gasifier of FIG. 1.

Referring to FIG. 2, in one embodiment manifold 46 is comprised of a gutter-like appendage. The latter includes a generally U-shaped member 47 fixedly welded or fastened along one leg to the baffle 39 lower edge. The manifold protrudes into the second annular gas passage 42. Thus, water droplets which have impinged against the baffle face 43 and are flowing downwardly, will fall into and accumulate within the gutter 47.

To return said water for further use in coolant pool 22, the gutter 47 is provided with at least one, and preferably with a plurality of openings or downspouts 48 which communicate with the gutter interior. As shown, each opening or downspout 48 extends downwardly toward coolant pool 22 and terminates at the latter. Preferably the downspout terminates with its discharge opening below the water's surface. Thus, the chance for drain water to be picked up by the gas flow is minimized.

The openings or downspouts 48 are of sufficient size to discharge collected water in a solid stream. When so formed, the likelihood of water being entrained into the passing gas flow is minimized.

Operationally, water collecting gutter 47 extends substantially, if not completely around the lower edge of the baffle 39. It will thereby collect water from the entire baffle's inner surface.

Figure 3:
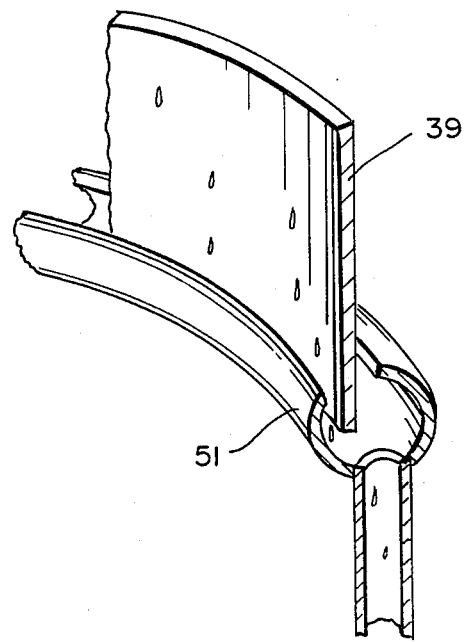
FIG. 3 is similar to FIG. 2.

In an alternate embodiment of the invention, as shown in FIG. 3, baffle 39 lower edge 42 can be provided with a pipe-like manifold 51 having a single opening 53 formed which is positioned immediately adjacent to the lower end of the baffle 39 inner surface. Manifold 51 as so positioned, will offer a minimal barrier and disturbance to the downward flow of the produced gas as the latter passes beneath the manifold underside, and upwardly into the third gas passage segment 44.

The arrangement here shown allows for a higher liquid level in coolant pool 22, which results in a greater degree of cooling of the produced gas. Without the water collecting means of this invention, higher liquid levels result in excessive liquid entrainment.

By improving this phase of the gas cooling operation, the propensity for plugging or accumulation of solids along the contact annulus is substantially reduced or eliminated. Further, the efficient removal of the water from produced gas stream avoids the possibility of said water being carried from the quench chamber 13 and into equipment downstream of the gasifier. Also, by recirculating used water back and down into pool 22 rather than into the downstream equipment, the liquid level within the coolant pool can be more readily controlled and is less susceptible to operational variations.

It is understood that although modifications and variations of the invention can be made without departing from the spirit and scope thereof, only such limitations should be imposed as are indicated in the appended claims.

We claim:

1. A gasifier, which houses means defining a combustion chamber in which a particulated combustible fuel is burned to produce an effluent stream comprised of a usable gas and a particulated solid residue, a quench chamber
   means located below said combustion chamber in said gasifier holding a pool of liquid coolant,
   a dip tube communicating said combustion chamber with the quench chamber to conduct said effluent stream into said coolant pool,
   a draft tube positioned outwardly of said dip tube defining a first annular gas passage therebetween,
   a vertically extending baffle plate having an inner wall, directed downwardly from the combustion chamber defining a second annular gas passage with said draft tube, and having a lower plate edge disposed above the surface of said coolant pool,
   liquid collecting manifold suspended from said baffle plate lower edge forming a continuation to the baffle inner wall, whereby to receive liquid which impinges against and flows down said inner wall,
   and a downspout extending from said manifold to an outlet at said pool of coolant to drain liquid from said manifold.

2. In the apparatus as defined in claim 1, wherein said liquid accumulating manifold forms a continuous, liquid holding trough about the baffle plate lower edge.

3. In the apparatus as defined in claim 1, wherein the downspout outlet terminates within said coolant pool.

4. In the apparatus as defined in claim 1, including a plurality of downspouts which extend downward from the manifold.

5. In the apparatus as defined in claim 1, including a plurality of downspouts formed in said manifold and extending downwardly from the latter.

6. In the apparatus as defined in claim 5, wherein said downspouts terminate at a point below the surface of said liquid coolant pool

* * * * *